Figure 1:
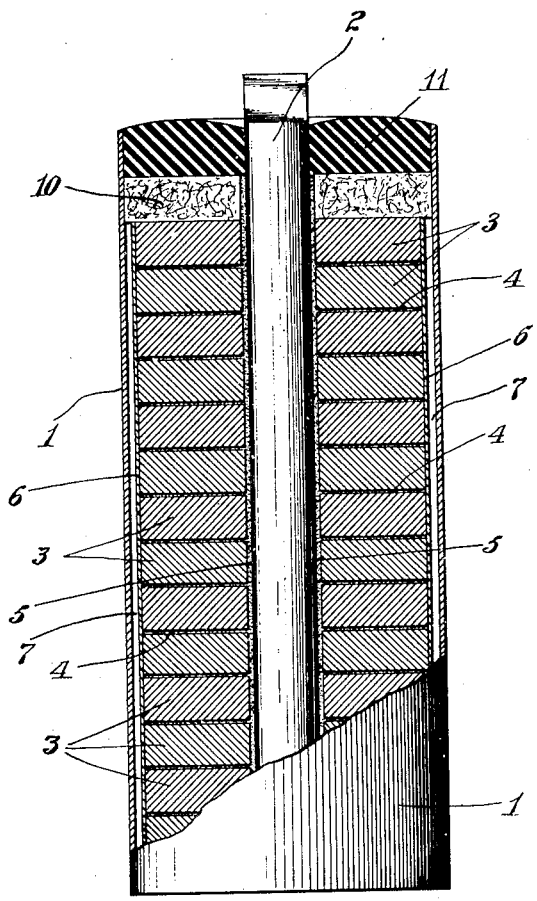

Aug. 2, 1927. 1,637,446
W. F. HENDRY
DRY CELL
Filed July 30, 1923 2 Sheets-Sheet 1.

INVENTOR
W. F. Hendry
BY
ATTORNEY

Aug. 2, 1927.  W. F. HENDRY  1,637,446
DRY CELL
Filed July 30, 1923   2 Sheets-Sheet 2
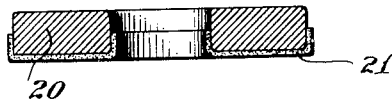
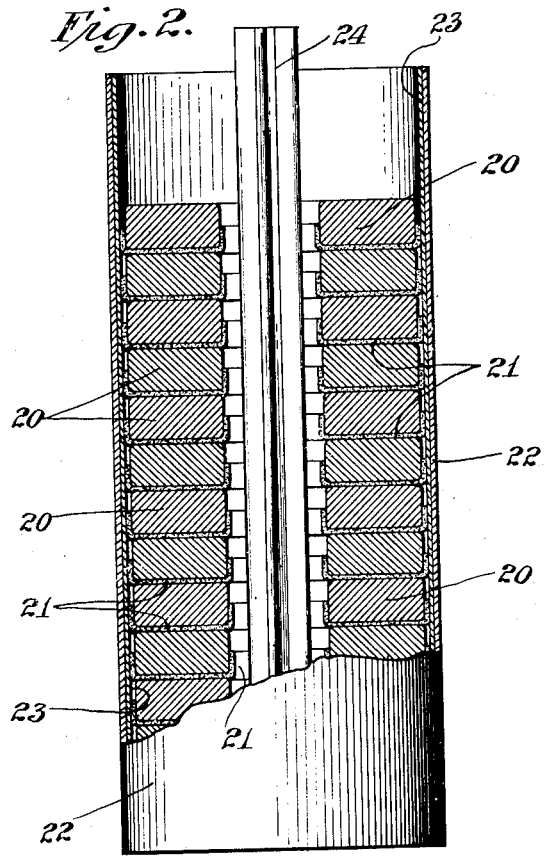
INVENTOR
W. F. Hendry
BY Paul Kolisch
his ATTORNEY Patented Aug. 2, 1927.

1,637,446

UNITED STATES PATENT OFFICE.

WILLIAM F. HENDRY, OF OSSINING, NEW YORK, ASSIGNOR, BY MESNE ASSIGNMENTS, TO NATIONAL CARBON COMPANY, INC., OF NEW YORK, N. Y., A CORPORATION OF NEW YORK.

DRY CELL.

Application filed July 30, 1923. Serial No. 654,611.

This invention relates to dry cells and its object is to improve the efficiency of dry cells and render the manufacture of dry cells more uniform and less expensive.

With this object in view, I introduce the depolarizing mixture into the dry cell structure in the form of layers preferably consisting of relatively firmly compacted ingredients, and provide between said layers relatively thin layers of conducting material contacting with one of the electrodes, and projecting towards and terminating near the other electrode.

The layers of depolarizing material are preferably compacted into tablets of any suitable size. In case of a carbon-zinc-manganese dioxid dry cell, these tablets are preferably composed of manganese dioxid mixed with a relatively small quantity of graphite. This mixture is compounded under pressure into tablets and if necessary a binding material may be mixed in with it. However, I have found that good results are obtained by compressing the mixture while in a dry condition and without the use of any binder. The tablets may be circular in shape and provided with a central aperture through which the carbon electrode may project.

In assembling such a dry cell, the tablets are stacked one on top of the other, a thin layer of graphite separating adjacent tablets. Preferably, this thin layer of graphite is obtained by applying a thin coating of finely powdered graphite to each side of a tablet. This may be readily accomplished by permitting said tablets to slide down a board to which graphite is being supplied, or in any other suitable manner. In order to insure that said layers of graphite be conductively connected with the carbon rod, the carbon rod is inserted in the central aperture along with sufficient finely powdered graphite, preferably by pouring such graphite around the carbon rod, while inserting the rod.

The method outlined above may be pursued where there is a variation in the diameter of the carbon pencil or of the hole in the annular tablet of depolarizing mixture. When, however, the process of manufacture of these two parts are sufficiently accurate, a satisfactory result can be obtained by merely inserting the carbon pencil into the hole, the relative sizes insuring a snug fit.

Due to the fact that said layers of graphite are in close contact with the carbon electrode, the effective surface of the latter will be materially increased, these graphite layers acting as projections thereof. Furthermore, the internal resistance of the element will be materially reduced because these layers of graphite terminate near the zinc electrode. In other words, the substantially uniform layers of graphite will provide a better path for the current than the tortuous and interrupted path that is afforded by coke or graphite powder which is mixed with the manganese dioxid or the like.

A further advantage of a dry cell assembled in accordance with the present invention consists in that the tablets of depolarizing mixture may be readily made of uniform size and weight, whereby the efficiency of dry cells will be kept more nearly standard than is possible in a cell in which the depolarizing mixture is tamped down. Furthermore, the tablets readily lend themselves to some suitable automatic making, feeding and assembling processes.

It is possible to secure approximately equal operating advantages by tamping, first a layer of depolarizing mix, then a layer of graphite, but such a method will not produce a uniform product and does not lend itself to labor saving equipment.

The invention is illustrated in the enclosed drawings in which Fig. 1 is a cross section of one embodiment, and Figs. 2, 2$^a$ and 2$^b$ a longitudinal cross-section and sectional detail views, respectively of a second embodiment.

Referring now to Fig. 1, 1 is the zinc can and 2 the carbon rod. 3 are the tablets of depolarizing mixture which are separated by thin layers of graphite 4. The carbon rod is surrounded by a cylindrical layer of graphite 5. The tablets 3 are stacked one on top of the other and are surrounded with a suitable cellulose container 6. By a cellulose container is meant a container of any porous, textile, paper or fibrous material. The space 7 between the container 6 and the zinc can 1 is filled with flour paste, either by applying such flour paste to the cellulose container before it is introduced into the zinc can, or by pouring such paste into the zinc can after the cellulose container is in place. The bottom of can 1 may be of zinc or paper and is separated from the lower end of the carbon rod 2 by means of the well known impervious bottom, e. g. of paraffined paper. A suitable electrolyte must of course be introduced into the dry cell, and it may be sealed in the usual manner by means of an absorbent cushion 10 of ground cork or sand and a layer of pitch 11.

Obviously, the invention may be subjected to numerous modifications without departing from the spirit thereof. It is applicable to dry cells of other types than the one herein disclosed, the number, shape and composition of the depolarizing tablets may be varied, etc. The layers of graphite 4 need not be provided in the form of coatings on adjacent tablets 3. The graphite may be formed into tablets like 3, a binder such as gelatine being preferably used. In this case tablets 4 and 3 are alternately placed over rod 2 to make up the element. In order to increase the life of the battery, blotting paper or other absorbent medium may be introduced, preferably in the form of washers or annular discs placed at certain intervals between adjacent tablets, or in any other suitable manner.

The exciting chemicals may be introduced in a dry form in the mixing of the depolarizer or they may be introduced in a liquid form and the resulting mixture dried prior to the molding of the tablets.

One of such modifications is illustrated in Figs. 2, 2ª and 2ᵇ. In this case, the annular tablets 20 are compressed mainly of manganese dioxid with which a relatively small amount of graphite is mixed. The main body of graphite is introduced in the form of annular tablets 21 of graphite having gelatine as a binder. As clearly shown in Fig. 2ª, the inside and outside rims of tablets 21 are turned up, and this tablet is formed partially to enclose a tablet 20. Tablets 20 and 21 are stacked one on top of the other in any suitable manner, and are introduced within a container 22, e. g. of iron and having a lining 23 of carbon. A zinc electrode 24, the cross-section of which is shown in Fig. 2ᵇ is used as a central electrode projecting through the aperture in tablets 20 and 21. The space around the zinc electrode 24 is filled up with a suitable electrolyte and paste.

Instead of the above mentioned ingredients, tablets 20 may be of copper oxide in which case tablets 21 will be thin films or sheets of copper and the carbon lining 23 replaced by any other suitable casing or electrode.

It should be noted also that stacks of tablets 20, 21 may be kept in stock suitably wrapped and ready for assembly with the other elements of a dry cell. Such stacks will be somewhat in the nature of "bobbins", and the central electrode may be inserted through the apertures before storing such bobbins or as a part of a battery assembly process just prior to the insertion of the bobbin into the container. Before insertion into the container the bobbin is preferably permitted to absorb the necessary moisture essential to the operation of the battery.

In accordance with a modification of the present invention, the depolarizer 3 (Fig. 1) may be mixed in a dry condition with a substance such as glue or any suitable expansible colloid which will expand when the depolarizer absorbs moisture. The cellulose container 6 is in this case tightly wrapped around the bobbin and is made of a material sufficiently strong to prevent the expansion of tablets 3. Originally, the tablets 3 fit rather loosely around the carbon pencil 2. When, however, the bobbin is soaked and the glue or the like tends to expand, due to the presence of the strong enclosure 6, the tablets 3 will be expanded inwardly whereby a close fit and therefore good contact will be insured between the tablets 3 and the carbon rod 2.

What I claim is:

1. In a dry cell, layers of depolarizing mixture, a carbon electrode surrounded by and a zinc electrode surrounding said layers, and extensions of said carbon electrode projecting between said layers towards the zinc electrode.

2. A dry cell composed of a plurality of tablets compacted of depolarizing and conducting materials, at least one face of each tablet having a coating of conducting material.

3. A dry cell composed of superimposed tablets compacted of depolarizing and conducting materials, the contacting surfaces of said tablets having a substantially uniform coating of conducting material.

4. A dry cell composed of superimposed tablets of depolarizing mixture containing carbonaceous material, the contacting surfaces of said tablets having a substantially uniform coat of carbonaceous material.

5. A dry cell composed of superimposed tablets of manganese dioxide-graphite mix, the contacting surfaces of said tablets having a substantially uniform thin coat of graphite.

6. In a dry cell, a zinc cup, a carbon electrode centrally located therein, superimposed annular tablets compacted of depolarizing mixture surrounding said carbon electrode, and thin layers of conducting material in intimate contact with said tablets and said carbon electrode.

7. In a dry cell, a zinc cup, a carbon rod centrally located therein, superimposed annular tablets composed of manganese dioxid and graphite mixture surrounding said carbon rod, and a coating of graphite at least on one face of each tablet.

8. In a dry cell, a container electrode, a second electrode centrally located therein, a plurality of tablets compacted of a depolarizing mixture, said tablets being stacked one above the other and having a central aperture through which said second electrode projects and surrounded by said container electrode, a relatively thin layer of conducting material surrounding said other electrode and in intimate contact therewith, with said tablets and with said thin layers of conducting material, a cellulose container surrounding said tablets, and paste filled in the space between said cellulose container and container electrode.

9. In a dry cell, a zinc container electrode, a carbon rod electrode centrally located therein, a plurality of circular tablets compacted of manganese dioxid and graphite, said tablets being stacked one above the other and having a central aperture through which said carbon rod projects and being surrounded by said zinc can, a relatively thin layer of graphite between adjacent tablets, a cylindrical layer of graphite surrounding said carbon rod and in intimate contact therewith, with said tablets and with said layers of graphite, a cellulose container surrounding said tablets, and flour paste in the space between said cellulose container and zinc can.

10. A dry cell composed of a plurality of tablets compacted of depolarizing and conducting materials, the surface condition of each tablet being such as to afford for at least a part of said surface a path of lesser resistance to current than the paths through the body of the tablet.

11. In a dry cell, a depolarizing mixture containing a medium adapted to expand when moistened, an electrode surrounded by said mixture, and an enclosure surrounding said mixture to prevent its expansion.

12. In a dry cell, a depolarizing mixture containing an expansible colloid, a carbon pencil loosely fitting within a hole in said mixture, and a strong cellulose enclosure around said mixture.

13. A dry cell composed of a plurality of tablets compacted of depolarizing and conducting materials, and a plurality of highly conductive and substantially straight current paths parallel with each tablet.

14. In a dry cell, a zinc container and a central carbon electrode, annular tablets compacted of depolarizing and carbonaceous materials surrounding said carbon and surrounded by said zinc electrode, and a plurality of thin substantially continuous conducting paths leading from said carbon towards said zinc electrode.

In witness whereof, I hereunto subscribe my name this 28th day of July, 1923.

WILLIAM F. HENDRY.